Dec. 13, 1966    T. M. HISCHAK    3,292,070
ELECTRIC MOTOR PROTECTOR CIRCUIT
Filed April 13, 1964

INVENTOR.
THOMAS M. HISCHAK
BY
*W. E. Finken*
HIS ATTORNEY

United States Patent Office 3,292,070
Patented Dec. 13, 1966

3,292,070
ELECTRIC MOTOR PROTECTOR CIRCUIT
Thomas M. Hischak, Rochester, N.Y., assignor to General Motors Corporation, Detroit, Mich., a corporation of Delaware
Filed Apr. 13, 1964, Ser. No. 359,250
1 Claim. (Cl. 318—472)

This invention pertains to dynamoelectric machines, and particularly to an improved overload protection circuit arrangement for compound wound direct current motors.

Heretofore, it has been the practice to employ thermal overload circuit breakers in automotive electric motors used for operating windshield wipers wherein the overload circuit breaker is connected in circuit with the motor so that the total motor current flows therethrough. A typical electric windshield wiper motor of this type is disclosed in Contant et al. Patent 2,985,024. A suitable overload circuit breaker is disclosed in Wood Patent 2,585,068, which circuit breaker is responsive to both ambient temperature and motor current.

The primary function of an overload circuit breaker in an electric motor circuit is to protect the motor from destruction due to excessive heat under a stalled condition. The overload circuit breaker setting is determined and calibrated by tests under stall conditions of the motor. It is well recognized that commercially available thermal overload circuit breakers cannot be economically calibrated to open at a precise time interval due to production methods and tolerances, and accordingly, commercially available overload circuit breakers have a spread of a predetermined time interval between the low and high limit trip times, which spread may be on the order of 8 seconds.

The high limit trip time of an overload circuit breaker is determined by tests to be that time interval which will prevent the armature temperature from exceeding the maximum temperature for which the particular wire insulation is designed. The low limit trip time is determined by the economics of manufacturing thermal overload circuit breakers. The smaller the spread between the lower and upper limits of the trip time, the higher the cost of the circuit breaker since greater care must be exercised in the manufacture thereof. Accordingly, if a given electric motor can be adequately protected with an overload circuit breaker having a large spread between the high and low limit trip times in lieu of a more expensive overload circuit breaker having a smaller spread between the high and low trip times, substantial savings can be realized.

The low limit circuit breaker trip time must be tested with the motor running under its designed load so as to determine the maximum load the motor can carry continuously without tripping the overload circuit breaker. I have determined by exhaustive testing that a change in the circuit connection of a thermal overload protector enable a large spread thermal overload protector to be used in a given motor circuit, and at the same time increase the maximum load at the low limit trip time, and in addition reduce the maximum armature temperature under stall conditions.

Accordingly, among my objects are the provision of an improved thermal overload protection circuit for a direct current electric motor of the compound wound type; a further provision of an improved protection circuit of the aforesaid type wherein the thermal overload circuit breaker is used for protecting only the armature circuit of a compound wound motor; the still further provision of an improved thermal overload protection circuit for a compound wound motor including a relatively wide spread thermal overload circuit breaker which is connected in and responsive to the current flow and ambient temperature in the armature and series field winding while the current flowing through the shunt field winding and auxiliary circuit components of the motor by-passes the circuit breaker.

The aforementioned and other objects are accomplished in the present invention by connecting a large spread thermal overload circuit breaker in circuit with only the wound armature and series field winding of a compound wound direct current electric motor. Relocation of the thermal overload circuit breaker results in both improved motor protection and improved motor performance as regards the maximum load carrying capacity at the low limit trip time of the circuit breaker.

Further objects and advantages of the present invention will be apparent from the following description, reference being had to the accompanying drawing, wherein a preferred embodiment of the present invention is clearly shown.

Figure 1:
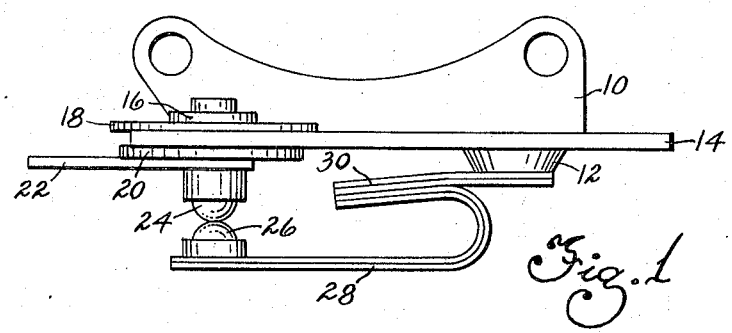
FIGURE 1 is a side elevational view of a thermal overload circuit breaker.

Referring to FIGURE 1, a thermal overload circuit breaker is disclosed comprising a metal base 10 having an upstanding terminal post 12 and an integral spade terminal 14 projecting therefrom. A second terminal post 16 is supported by the base 14 and insulated therefrom by dielectric washers 18 and 20. The second terminal post 16 is connected to a second spade terminal 22 which extends outwardly from the base 10 in a direction opposite to the spade terminal 14. The terminal post 16 has a fixed contact 24 welded thereto which is engageable by a movable contact 26 welded to one end of a main bimetal strip 28. The bimetal strip 28 is bent in a U-shape and the shorter leg thereof is welded to a relatively short auxiliary bimetal strip 30 which has its other end welded to the terminal post 12. As alluded to hereinbefore, the thermal overload circuit breaker, per se, constitutes no part of the present invention, and the illustrative embodiment disclosed is only by way of example and is not to be construed by limitation.

The aforedescribed thermal overload circuit breaker is responsive to both ambient temperature and temperature produced by current flowing through the bimetal strips 28 and 30. Moreover, as alluded to hereinbefore, the time interval, or spread, between the low limit trip time and the high limit trip time of the circuit breaker determines the cost thereof, i.e. the smaller the spread the higher the cost and the larger the spread the lower the cost. Moreover, for a given spread trip time circuit breaker, the high and low limit trip times can be simultaneously adjusted by deformation, or deflection, of the auxiliary bimetal strip 30 and the short leg of the main bimetal strip 28. For example, if a thermal overload circuit breaker is manufactured with a low limit trip time of 17 seconds and a high trip time of 25 seconds, the high and low trip times can be changed to 24 seconds and 16 seconds respectively, thereby retaining the 8 second spread merely by altering the configuration of the auxiliary bimetal strip 30 and the short leg of the main bimetal strip 28, all in a manner well known to those skilled in the thermal overload circuit breaker art.

Figure 2:
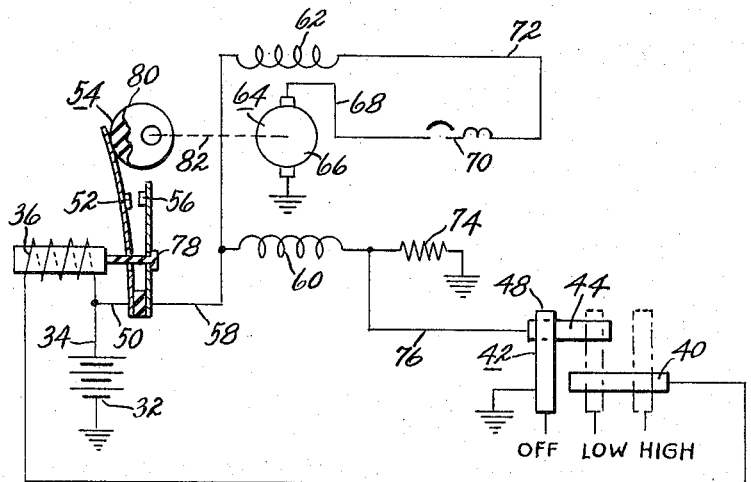
FIGURE 2 is a schematic circuit diagram of the improved motor protection circuit as used in automotive electric windshield wiper systems.

Referring to FIGURE 2 the improved motor protection circuit for an electric windshield wiper system will be described. This circuit comprises a battery 32 having one terminal grounded and its other terminal connected to a wire 34. The wire 34 is connected to a relay coil 36 which in turn is connected to a wire 38 to a fixed contact 40 of a manual control switch 42. The manual control switch includes a second fixed contact 44 and a movable bridging contact 48 which is grounded.

The wire 34 is also connected to a wire 50 that connects with a movable leaf spring carried contact 52 of a park and run switch 54. The contact 52 is engageable with a leaf spring carried contact 56 connected by wire 58 to the ends of a shunt field winding 60 and a series field winding 62 of a direct current compound wound electric motor 64. The leaf spring carried contacts 52 and 56 are inherently biased towards each other. The motor 64 includes a wound armature 66 having one terminal connected to ground and its other terminal connected through wire 68 to one terminal of a thermal overload circuit breaker 70 which may be of the type shown in FIGURE 1. The other terminal of the circuit breaker 70 is connected by wire 72 to the other end of the series field winding 62. The other end of the shunt field winding 60 is connected to one end of a speed controlling resistor 74 the other end of which is grounded. In addition, the fixed switch contact 44 is connected by wire 76 to the junction between the shunt field winding 60 and the resistor 74.

The park and run switch 54 is actuated by a relay plunger 78 to the closed position due to deflection of the leaf spring carried contact 56, and is mechanically actuated to the open position by a cam 80 which is shown as being schematically driven from the motor 64 through a mechanical connection 82 therewith. To energize the motor 64, the movable bridging contact 48 is moved to either the low or high speed positions. Assuming it is moved to the low speed position, a circuit is completed from the battery 32 and wire 34 through the relay coil 36, wire 38, and contacts 40 and 48 thereby energizing the relay coil 36 so as to engage contact 56 with contact 52. When contacts 52 and 56 are engaged the motor 64 will be energized from the battery 32 through wires 34 and 50, switch contacts 52 and 56 and wire 58. In the low speed position of the switch 42 the shunt field winding 60 will be directly connected to ground through wire 76 and contacts 44 and 48. The armature circuit of the motor 64 will be energized through the thermal overload circuit breaker 70. In the high speed position of the switch 48 the energization of the shunt field winding 60 is reduced by the connection of resistor 74 in series therewith.

In a typical windshield wiper motor circuit under continuous maximum load running conditions, the total motor current including the armature circuit, the shunt field circuit and the relay coil 36 may be on the order of 5.3 amperes. Of this total current the shunt field current is 1.6 amperes and the relay coil current is 0.3 ampere. Accordingly, by by-passing the shunt field and relay current armature the circuit breaker 70 will have to carry only 3.4 amperes. Under these conditions the maximum load imposed on the motor 64 can be increased 0.3 foot pounds from 2.2 foot pounds to 2.5 foot pounds without tripping the circuit breaker at the low limit trip time. In addition, the low limit trip time can be reduced from 17 seconds to 16 seconds. On the other hand, under stall conditions of the motor 64 the circuit breaker will take a longer time to trip due to the reduced current flow therethrough which would ordinarily tend to increase the armature temperature. However, since the low limit trip time is decreased by one second the high limit trip is likewise decreased one second from 25 seconds to 24 seconds and tests have indicated that the maximum armature temperature is reduced from 216° C. to 200° C. Of course, the revised circuit connections results in higher temperatures in the shunt field winding under continuous stall conditions, but since these temperatures are below the maximum allowable, the motor is adequately protected.

The following chart sets forth the performance and temperature comparisons of the same motor having a circuit breaker connected in the entire motor circuit and a circuit breaker connected in only the armature circuit.

|  | Entire Motor Circuit | Armature Circuit Only |
| --- | --- | --- |
| Circuit Breaker Spread _____seconds__ | 17–25 | 16–24 |
| High Speed Stall ° C. Armature_____° C__ | 216 | 200 |
| High Speed Stall ° C. Shunt Field_____° C__ | 145 | 149 |
| Low Speed Stall ° C. Armature_____° C__ | 198 | 199 |
| Low Speed Stall ° C. Shunt Field_____° C__ | 156 | 193 |
| Low Speed Maximum Load_____ft. lbs__ | 2.2 | 2.5 |

In addition, failure time of electric motors under continuous stall conditions has been increased to approximately 30 hours with the thermal overload circuit breaker connected at the armature circuit only from approximately 20 hours when the same spread circuit breaker is connected in the entire motor circuit. Thus, the improved motor protection circuit results both in improved motor performance and improved motor protection with no increase in cost of the circuit breaker used. The motor is adequately protected in the improved motor circuit notwithstanding the fact that the relay coil of the shunt field circuits are by-passed since the circuit breaker is designed to protect the armature under stall conditions and thus even though the shunt field winding and relay coil are connected so that the current flowing through them passes through the circuit breaker, the circuit breaker cannot be adjusted to be sensitive to relay coil shorts or shunt field winding failures.

While the embodiment of the present invention as herein disclosed constitutes a preferred form, it is to be understood that other forms might be adopted.

What is claimed is as follows:

An energizing circuit for a direct current compound wound motor having an armature, series field winding and a shunt field winding, said energizing circuit comprising: an electric power source; a relay operated switch including a coil and a pair of contacts closed upon energization of said coil; a first circuit connecting said shunt field winding through said relay operated switch to said power source; a second circuit connecting said armature and series field winding through said relay operated switch to said power source; a thermal overload circuit breaker having a large spread between the low limit trip time and the high limit trip time connected in said second circuit; and a third circuit including manual switching means for energizing said relay coil from said power source whereby closure of said manual switching means energizes said motor such that the current flow through said relay coil and said shunt winding bypasses said overload circuit breaker and only current normally flowing through the armature and the series field winding flows through said overload circuit breaker, said thermal overload circuit breaker thereby carrying only the current normally passing through the armature and the series field winding while offering thermal overload protection for the entire motor.

References Cited by the Examiner

UNITED STATES PATENTS 2,651,013    9/1953    Bohl _____ 318—275
2,825,019    2/1958    Harrison _____ 318—466

FOREIGN PATENTS 510,161    7/1939    Great Britain.

ORIS L. RADER, *Primary Examiner.*

J. C. BERENZWEIG, *Assistant Examiner.*